(12) United States Patent
Kwon et al.

(10) Patent No.: US 7,707,409 B2
(45) Date of Patent: Apr. 27, 2010

(54) METHOD AND SYSTEM FOR AUTHENTICATING SOFTWARE

(75) Inventors: Ji-Hun Kwon, Ansan-si (KR);
Seung-Hyouk Yim, Seoul (KR);
Gwang-Ho Nam, Seoul (KR)

(73) Assignee: KT Corporation, Seongnam (KR)

( * ) Notice: Subject to any disclaimer, the term of this patent is extended or adjusted under 35 U.S.C. 154(b) by 929 days.

(21) Appl. No.: 10/971,597

(22) Filed: Oct. 21, 2004

(65) Prior Publication Data
US 2005/0120209 A1 Jun. 2, 2005

Related U.S. Application Data

(63) Continuation of application No. PCT/KR02/01447, filed on Jul. 31, 2002.

(30) Foreign Application Priority Data

Apr. 30, 2002 (KR) ............... 10-2002-0023618

(51) Int. Cl.
*H04L 29/06* (2006.01)
(52) U.S. Cl. .............. 713/161; 713/167; 713/171; 713/189; 726/17; 726/21; 726/29; 380/247
(58) Field of Classification Search ............ 726/29; 713/161
See application file for complete search history.

(56) References Cited

U.S. PATENT DOCUMENTS 5,119,377 A * 6/1992 Cobb et al. ............... 714/38
5,402,490 A * 3/1995 Mihm, Jr. ................. 380/247
5,909,437 A   6/1999 Rhodes et al. ............ 370/349
6,243,468 B1 * 6/2001 Pearce et al. ............. 380/255
6,253,326 B1   6/2001 Lincke et al. ............. 713/201
6,829,708 B1 * 12/2004 Peinado et al. ........... 713/156
2003/0191955 A1 * 10/2003 Wagner et al. ............ 713/191
2004/0064723 A1 *  4/2004 Barnes et al. ............. 713/201

FOREIGN PATENT DOCUMENTS

JP 10-327139 12/1998
JP 11-203128 7/1999

OTHER PUBLICATIONS

International Search Report (1 page).

* cited by examiner

*Primary Examiner*—Matthew B Smithers
*Assistant Examiner*—Shewaye Gelagay
(74) *Attorney, Agent, or Firm*—Knobbe Martens Olson & Bear LLP (57) ABSTRACT

The invention relates to a method and system for authenticating software. One embodiment of the invention provides a system for authenticating software in a mobile terminal, wherein the system is configured to: receive an execution instruction for software installed in the mobile terminal through an inputting means, generate a first error code for the software, extract a mobile terminal identifier of the mobile terminal, generate a first authentication key by combining the mobile terminal identifier and the first error code, and execute the software when the first authentication key corresponds to a second authentication key stored in the mobile terminal. By authenticating the software for a wireless mobile terminal, one embodiment of the invention can prevent unauthorized duplication and execution of the software at the mobile terminal.

23 Claims, 10 Drawing Sheets

| | SECURITY LEVEL | $S_7$ $S_6$ $S_5$ $S_4$ $S_3$ $S_2$ $S_1$ $S_0$ |
|---|---|---|
| 342 | LEVEL 0 | 0 0 0 0 0 0 0 0 |
| 344 | LEVEL 1 | 0 0 0 0 0 0 0 1 |
| 346 | LEVEL 2 | 0 0 0 0 0 0 1 0 |
| 348 | LEVEL 3 | 0 0 0 0 0 0 1 1 |
| 350 | LEVEL 4 | 0 0 0 0 0 1 0 0 |
| 352 | LEVEL 5 | 0 0 0 0 0 1 0 1 |
| 354 | LEVEL 6 | 0 0 0 0 0 1 1 0 |
| 356 | LEVEL 7 | 0 0 0 0 0 1 1 1 |
| 358 | LEVEL 8 | 0 0 0 0 1 0 0 0 |

METHOD AND SYSTEM FOR AUTHENTICATING SOFTWARE

RELATED APPLICATIONS

This application is a continuation application, and claims the benefit under 35 U.S.C. §§120 and 365 of PCT Application No. PCT/KR02/01447, filed on Jul. 31, 2002 and published Dec. 24, 2003, in English, which is hereby incorporated by reference.

BACKGROUND OF THE INVENTION

1. Field of the Invention

The invention relates to a method and system for authenticating software, and more particularly, a method and system for using the software on an authenticated mobile terminal through the authentication process when using the software downloaded from a server in a mobile terminal.

2. Description of the Related Technology

Up to now, even an unauthorized mobile terminal can freely download and use a software, which was developed after extensive time and effort, and duplicate the downloaded software to another mobile terminal. Also, since the duplication without permission results in copyright infringement, litigation is quite possible to prevent it from continuing.

Especially, various wireless Internet contents have been developed along with the wide use of mobile terminal; however, the technical solutions for protecting copyrights of software for a mobile terminal are wholly lacking.

Also, the mobile terminal is quite different in performance and capacity compared with a conventional computer such as a PC (personal computer). Namely, the software for a mobile terminal (hereinafter 'mobile software') can be distinguished from the software for a conventional computer with regard to the small data size due to the limited memory capacity and the CPU performance of the mobile terminal.

Thus, an authentication method compatible with the characteristics of the mobile software is possible, however, no authentication method has yet to be developed. Also, the mobile software would be uploaded to a server and then downloaded to a mobile terminal even in the course of development due to the characteristics of the mobile terminal.

Still a high possibility exists that the mobile software under development might be duplicated and exploited by a competitor. Thus, there is a need for an authentication method to protect the mobile software from being duplicated without permission.

SUMMARY OF CERTAIN INVENTIVE ASPECTS OF THE INVENTION

One aspect of the invention provides an authentication method and system that protects the mobile software from unauthorized duplication but allows for execution through an authentication method and system compatible with the mobile software.

Another aspect of the invention provides an authentication method and system that protects the copyright owner of the mobile software substantially preventing unauthorized duplication.

Another aspect of the invention provides an authentication method and system compatible with the characteristics of mobile terminal.

Another aspect of the invention provides an authentication method and system that prevents the unauthorized duplication of the mobile software being developed.

Still another aspect of the invention provides a method for authenticating mobile software and a system thereof. Also, there is provided a computer-readable medium including a program containing computer-executable instructions for performing a method for authenticating software.

Still another aspect of the invention provides a method for authenticating software in a mobile terminal, the method comprising: receiving an execution instruction for software installed in the mobile terminal through an inputting means; generating a first error code (or first code) for the software; extracting a mobile terminal identifier of the mobile terminal; generating a first authentication key by combining the mobile terminal identifier and the first error code; and executing the software when the first authentication key corresponds to a second authentication key stored in the mobile terminal.

Also, the method further comprises: receiving a download file from a download server coupled to the mobile terminal, wherein the download file comprises software data and a second error code (or second code); generating a third error code (or third code) for the software data in the mobile terminal; storing the software data on the mobile terminal if the second error code corresponds to the third error code; extracting the mobile terminal identifier from the mobile terminal; and generating the second authentication key by combining the mobile terminal identifier and the second error code in the mobile terminal.

And, the mobile terminal identifier is Electronic Serial Number (ESN), and the first error code, the second error code, and the third error code are a frame check sequence generated by CRC method.

Also, if the software is software for a developer, the first error code, the second error code, and the third error code are a 32 frame check sequence, and if the software is a commercial software, the first error code, the second error code, and the third error code are a 16 frame check sequence.

And, the download file further comprises a header including information relative to the first error code, and further comprises first security level information.

And, the method further comprises: extracting the first security level information for the download file; receiving INF from the download server, wherein the INF includes second security level information; and comparing the first security level information with the second security level information, wherein if the first security level information and the second security level information do not correspond with each other according to the comparison, the software is not stored on the mobile terminal.

Yet another aspect of the invention provides a method for authenticating software in a download server coupled to a mobile terminal through a network, the method comprising: receiving a download request signal from the mobile terminal, wherein the download request signal includes a mobile terminal identifier of the mobile terminal; identifying the mobile terminal by use of the mobile terminal identifier, wherein the mobile terminal comprises a user mobile terminal and a developer mobile terminal; determining whether or not the software is permitted to be downloaded at the mobile terminal; extracting software data corresponding to the download request signal, wherein the software comprises commercial software and software for a developer; generating an error code for the software data corresponding to the mobile terminal; generating a download file including the software data and the error code; and transmitting the download file to the mobile terminal, wherein the mobile terminal controls the execution of the software by use of an authentication key generated by combining the error code and the mobile terminal identifier.

Also, the method further comprises: extracting security level information corresponding to the software; generating a download file that further includes the security level information; generating an INF including the security level information; and transmitting the INF to the mobile terminal, wherein the mobile terminal compares the security level information included within the INF with the security level information included within the download file to check for an error of the INF. Where, the security level information is determined in advance by considering the range of usable resource of the mobile terminal.

DESCRIPTION OF CERTAIN INVENTIVE EMBODIMENTS

In particular the terms used in this specification will be defined as follows.

'Mobile terminal' comprises a cellular phone, PCS(Personal Communication Service), PDA(Personal Digital Assistant) and all mobile terminals that will be developed in the near future. This mobile terminal will be classified as either a 'user mobile terminal' or 'developer mobile terminal' according to one embodiment of the invention.

'Download server' generates and transmits a download file comprising software data, an error correction code, and a header to a mobile terminal.

'Software' will be classified into 'software for developer' and 'commercial software', and the development process can be securely maintained by allowing the software for developer to be downloaded only to developer mobile terminal.

'Authentication key (hereinafter 'A-key')' is generated by combining the error code and a mobile terminal identifier, and the duplicated software cannot be executed without an A-key.

'Mobile terminal identifier' is a unique identifier assigned to each mobile terminal, and these mobile terminals can be distinguished from each other by use of the mobile terminal identifier. Electronic serial number can be used as a mobile terminal identifier.

'Electronic serial number (abbreviated as 'ESN'), which is differentiated from a manufacturing serial number, is a number string designated to each mobile terminal. The mobile terminal manufacturers register the ESN with a mobile service provider of a country where the mobile device will be used. Therefore, through the pre-registered ESN, the mobile terminal is registered with that mobile service provider or a change of mobile terminal is accomplished. Since the ESN is unique to each terminal and difficult to duplicate, preferably the ESN is used as a mobile terminal identifier.

'Configuration Information File (abbreviated as 'INF') contains system information. Upon installing or running a program, hardware configuration information, especially driver files suitable for the hardware, can be provided from INF.

Hereinafter, the software authentication method and system according to embodiments of the invention will be described in detail with the accompanying drawings. Also, in describing embodiments of the invention with the accompanying drawings, all the elements of the embodiments will be indicated by the same reference numbers irrespective of the number of drawings.

Figure 1A:
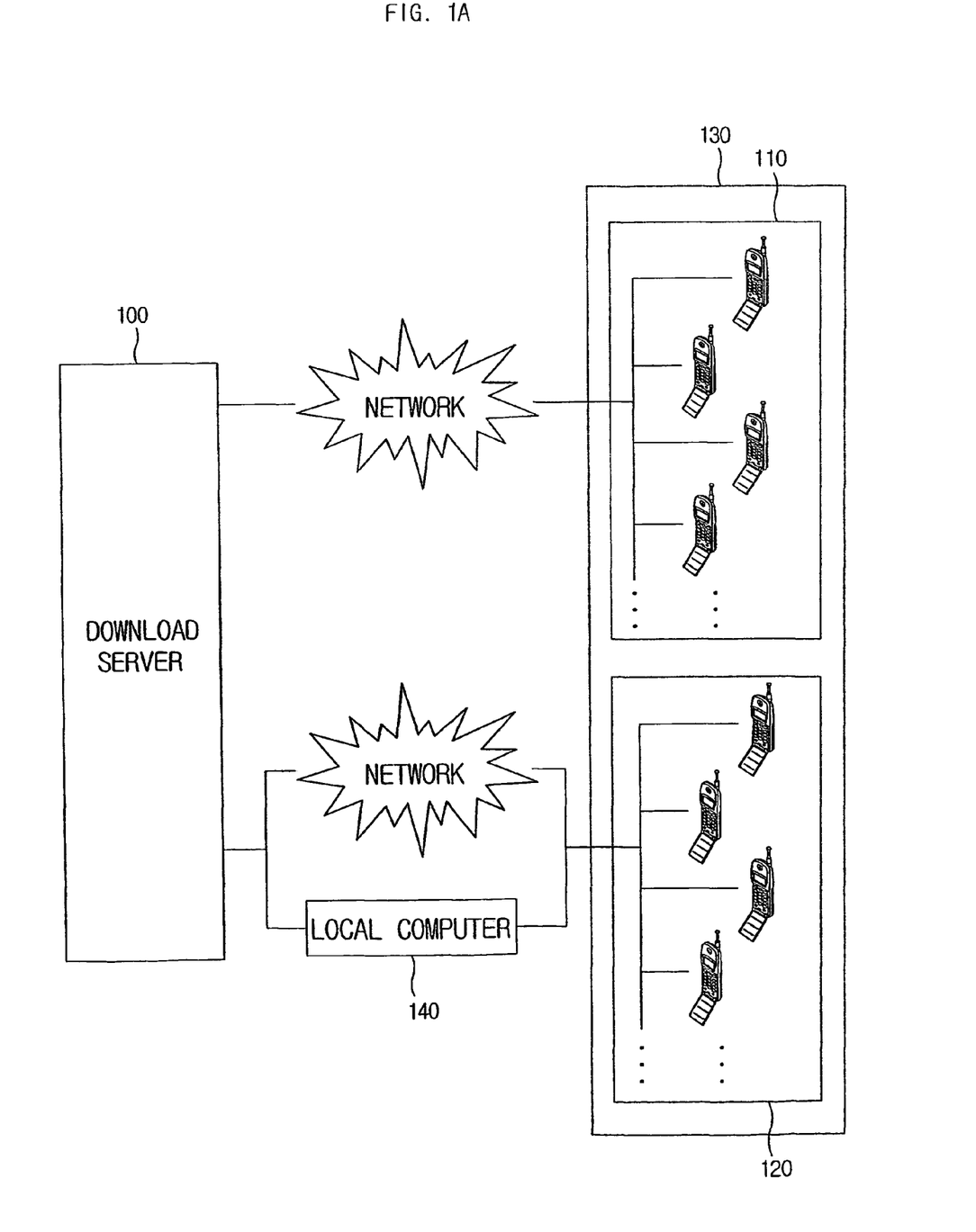
FIG 1a is a schematic diagram of the software authentication system according to one embodiment of the invention.

FIG. 1a is a schematic diagram of the software authentication system according to one embodiment of the invention. Referring to FIG. 1a, the software authentication system comprises a download server 100 and a mobile terminal 130, and can further comprise a local computer 140.

The download server 100 provides software under development or developed software to the mobile terminal 130 through a network or the local computer 140, which is coupled to the download server 100.

The mobile terminal 130 has a unique identifier that is assigned to the mobile terminal 130. If the mobile terminal 130 has the unique identifier, the kind of mobile terminal can vary as follows: cellular phone, PCS (Personal Communications Service), PDA (Personal Digital Assistant), etc., can all be the mobile terminal 130.

The mobile terminal 130 can be classified into a developer mobile terminal 110 and a user mobile terminal 120. The developer mobile terminal 110, which is used by someone who develops software, receives the software from the download server 100 for testing the software under development. Furthermore, the user mobile terminal 120, which is used by a subscriber who uses the commercial software, receives the software with or without a fee being charged depending on the situation.

In one embodiment, the methods of the mobile terminal 130 for accessing the download server 100 can be classified into a network method that uses a network for access and a serial method that uses cable for access. In the network method, the software is divided into several data packets and transmitted through the conventional mobile network or the next generation network that will be developed. The developer who accesses the download server 100 with the developer mobile terminal 110 uses the serial method for developing the software. When accessing the download server 100 by the serial method, the developer can access the download server 100 through the local computer 140. Since more time is required for downloading in the network method, use of the serial method is preferable for accessing the download server 100 with the developer mobile terminal 110 for efficiency.

In one embodiment, the authentication of software data can be performed by using the ESN as an identifier for identifying the mobile terminal 130. The software authentication method is performed immediately before storing the downloaded software on the mobile terminal 130 by using an A-key that is generated by combining an error code included within the software and the ESN. The method for generating the A-key will be described later in connection with FIG. 5.

Since the algorithm for generating the A-key in embodiments of the invention is very simple, this algorithm is suitable for the mobile terminal 130 by taking into consideration the operating environment of the mobile terminal, namely, the limited memory capacity and the low CPU performance.

Since the authentication method with sophisticated encryption used in the general computer increases loads of the mobile terminal 130 and the time for authenticating increases correspondingly, the method cannot be employed as an authentication method for the mobile software. Thus, the authentication method using the A-key generated by combining the error code and ESN is compatible with the operating environment of the mobile terminal 130. Moreover, the authentication method can reduce the time for authenticating, and provide a copying prevention effect by using ESN that is unique to each mobile terminal 130.

Figure 1B:
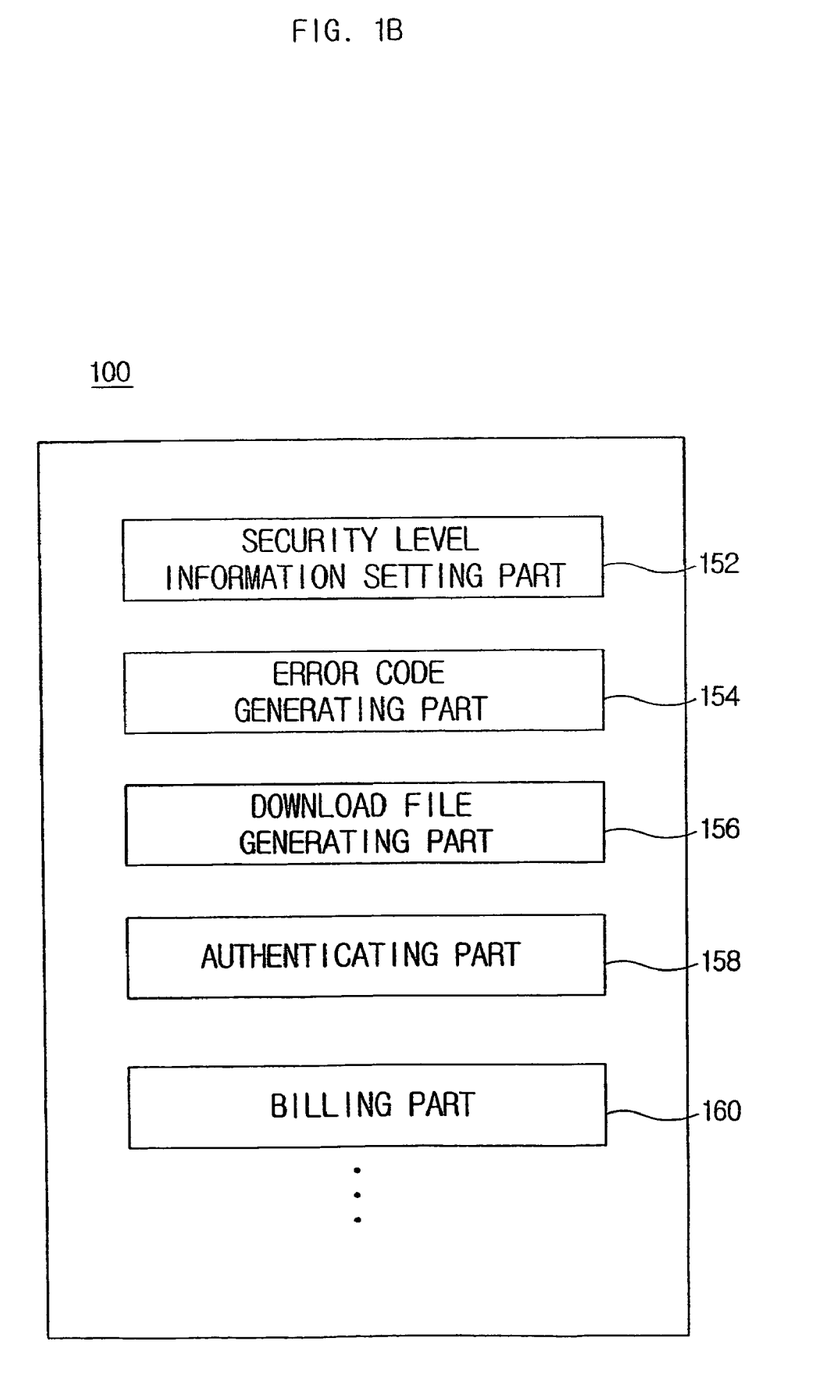
FIG 1b is a block diagram of the download server according to one embodiment of the invention.

FIG. 1b is a block diagram of the download server according to one embodiment of the invention. In describing the software authentication method, general functions of download server 100 will be omitted. Referring to FIG. 1b, the download server 100 comprises a security level information setting part 152, an error code generating part 154 and a download file generating part 156, and can further comprise an authenticating part 158 and billing part 160.

The security level information setting part 152 sets security level information corresponding to each unit of uploaded software. The resource that is permitted to use the software when the software is operated on the mobile terminal 130 is determined according to security level information. The security level information will be described with FIG. 3b.

The error code generating part 154 generates an error code included within the download file, so that the mobile terminal 130 checks for the occurrence of error in the received software data by use of the error code.

The download file generating part 156 attaches a header, the error code, and security level information to the software data to generate the download file.

The authenticating part 158 performs an authentication with the mobile terminal when the mobile terminal 130 accesses to the download server 100. This authentication will be performed by use of a subscriber's ID (identification) and password, and also by use of the mobile terminal identifier, namely, the ESN.

The billing part 160 bills the software data that is downloaded from the download server 100 to the subscriber. The commercial software can be downloaded or distributed with charge or without charge, and the billing can be performed for each unit of software. The charge can be demanded from the subscriber as a service charge of the mobile terminal or a payment via credit card.

Figure 1C:
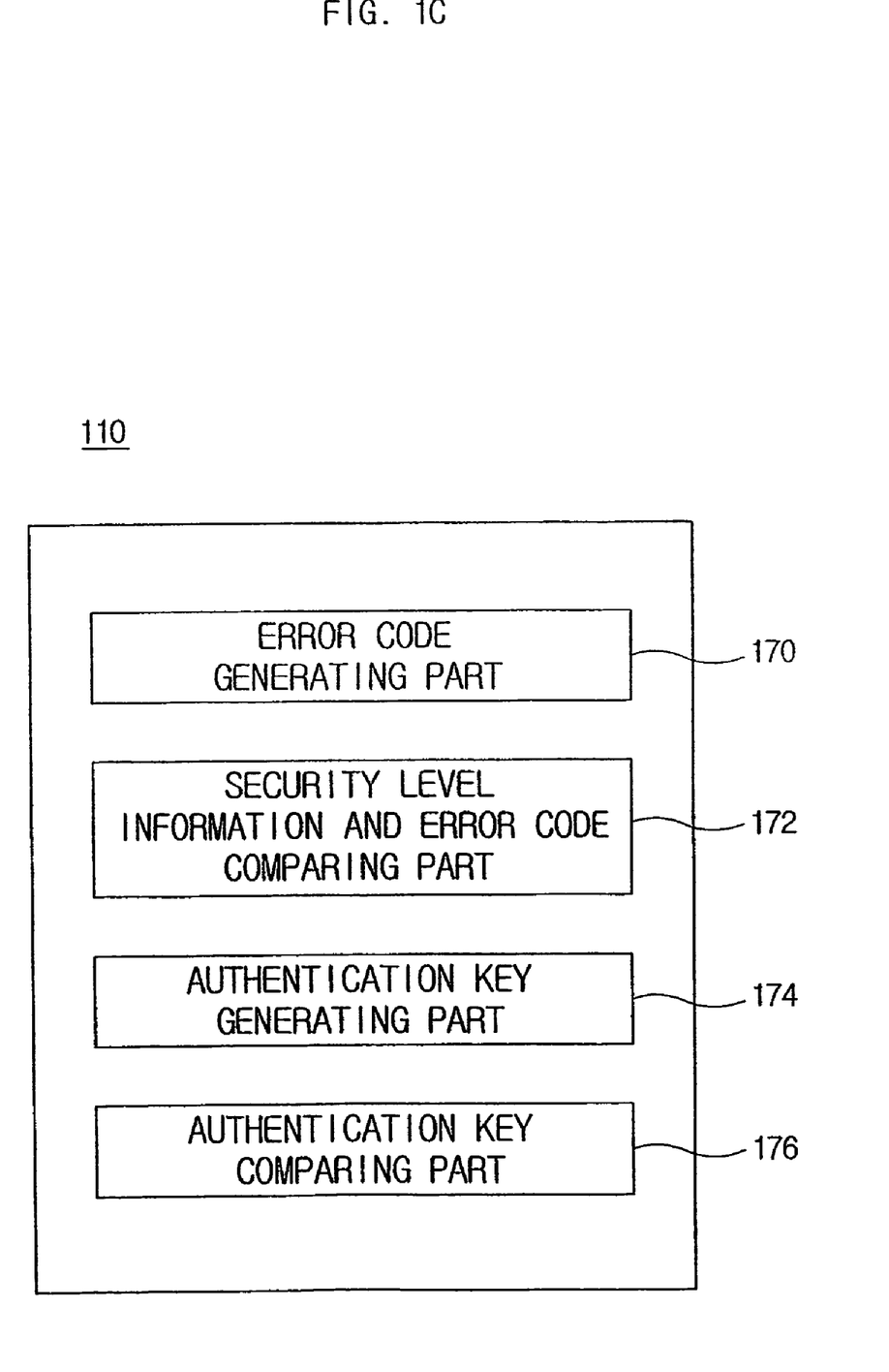
FIG 1c is a block diagram showing the functions of the mobile terminal according to one embodiment of the invention.

FIG. 1c is a block diagram showing the functions of the mobile terminal according to one embodiment of the invention. The description of general functions of the mobile terminal will be omitted for describing the authentication method in detail. Referring to FIG. 1c, the mobile terminal 130 comprises an error code generating part 170, a security level information and error code comparing part 172, an A-key generating part 174, and an A-key comparing part 176.

The error code generating part 170 functions to generate an error code, and the generating method is the same as the method of the download server 100. Namely, the error code generating part 170 generates the error code of the received software data, so that the mobile terminal 130 can check the occurrence of error in the software data.

The security level information and error code comparing part 172 compares the security level information and error codes to find the occurrence of error in the security level information and software data included within the download file. That is, the occurrence of error in the software data can be checked by comparing the error code generated by the error code generating part 170 with the error code extracted by the download server. Also the occurrence of error in the security level information can be checked by comparing the security level information included within the download file with the security level information included within INF that was received separately from the download file.

The A-key generating part 174 generates A-key when storing the software data received from the download server on the mobile terminal 130. The A-key can be generated by combining the error code and ESN of the mobile terminal 130.

The A-key comparing part 176 controls the execution of the software data by use of the A-key generated by the A-key generating part 174. Namely, the execution of the software data can be controlled by comparing the A-key stored in the mobile terminal with the A-key generated whenever the software data is executed.

Figure 2:
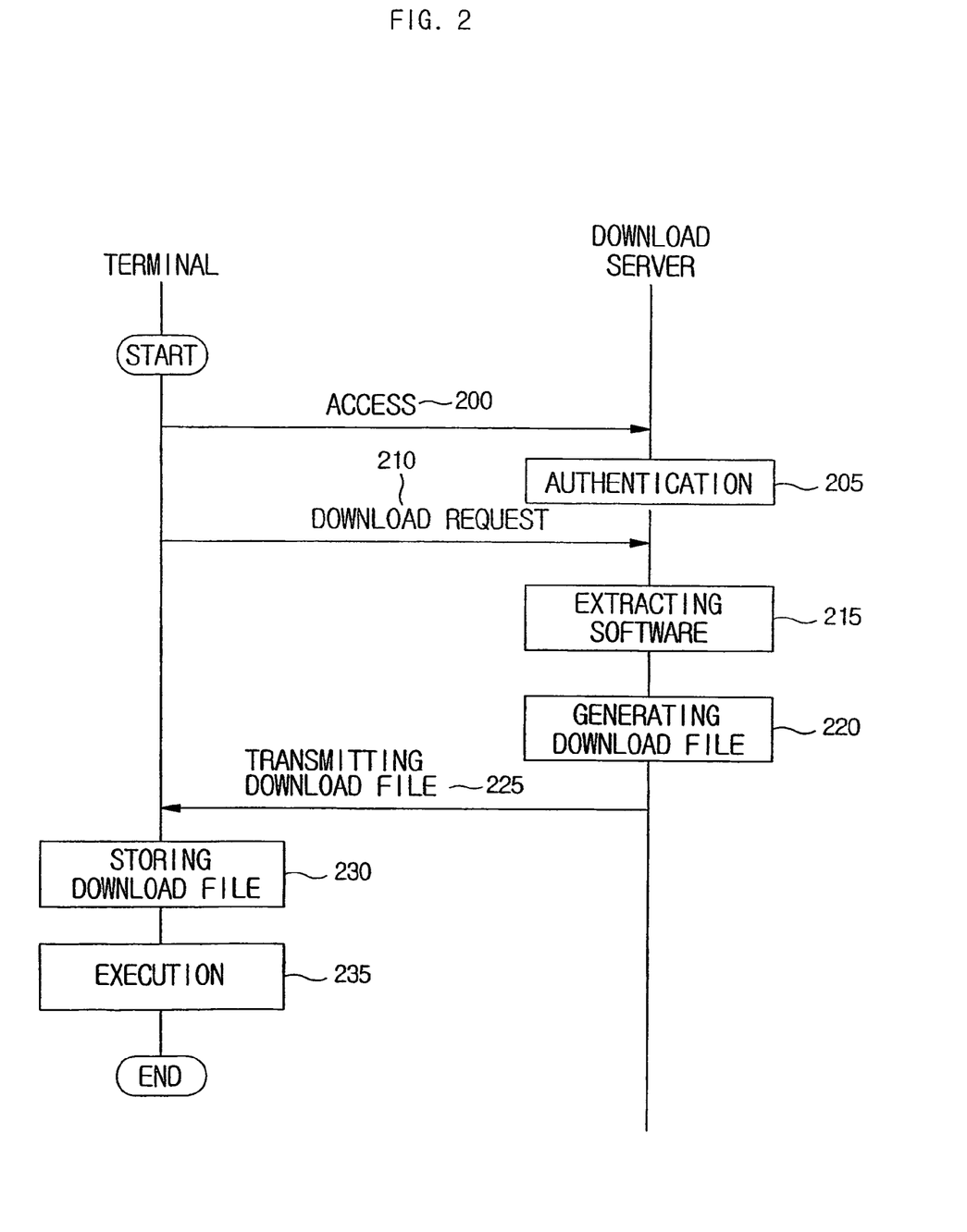
FIG. 2 is a flowchart of downloading software data in the mobile terminal according to one embodiment of the invention.

FIG. 2 is a flowchart of downloading software data in the mobile terminal according to one embodiment of the invention.

Currently, much mobile software has already been commercialized and under development along with the popularization of the mobile terminal. Thus, this mobile software can be protected from unauthorized duplication or illegal duplication by one embodiment of the invention. Namely, according to embodiments of the invention, the mobile software data will be provided to the mobile terminal 130 that the server authenticates. Also, even if the mobile software in the authenticated mobile terminal were duplicated to other mobile terminal without permission, the duplicated software would not be executed because of the A-key.

Hereinafter, the download procedure of software in the download server according to one embodiment of the invention will be described with FIG. 2. At step 200, the mobile terminal 130 accesses the download server 100 through a network. As described in FIG. 1a, the methods of the mobile terminal 130 for accessing the download server 100 can be classified into a network method that uses the network for access and a serial method that uses cable for access. The network method is described mainly with FIG. 2 and the serial method will be described with FIG. 7b.

At step 205, the download server 100 authenticates the mobile terminal 130 that accesses the download server 100. The authentication in the download server 100 is performed with an ID and password of the subscriber, i.e., the mobile terminal's user.

After authentication, the mobile terminal searches for the software to download, and at step 210, the mobile terminal 130 transmits a download request signal for the searched software to the download server 100.

At step 215, upon receiving the download request signal, the download server extracts the requested software data and generates a download file that includes the software data. The download file can comprise a header, the software data, the security level information, and the error code.

After generating the download file, at step 225 the download server transmits the download file to the mobile terminal 130.

At step 230, the mobile terminal extracts the software data from the download file and stores it on memory. The storage procedure can be divided into error detection, data storage, and an A-key generation. The error detection is to detect the occurrence of error in the software data and the security level information of the received download file. The data storage is to store the software data on the mobile terminal 130 if no error is detected in the error detection. The A-key generation is to generate A-key by combining the error code and the ESN. The data storage will be described with FIG. 5 in detail.

At step 235, the mobile terminal 130 can execute the software that corresponds to the software data stored on the mobile terminal. When executing the software, the execution of the software can be controlled by use of the A-key generated at step 230.

The execution of step 230 will be described later with FIG. 6 in detail.

Figure 3A:
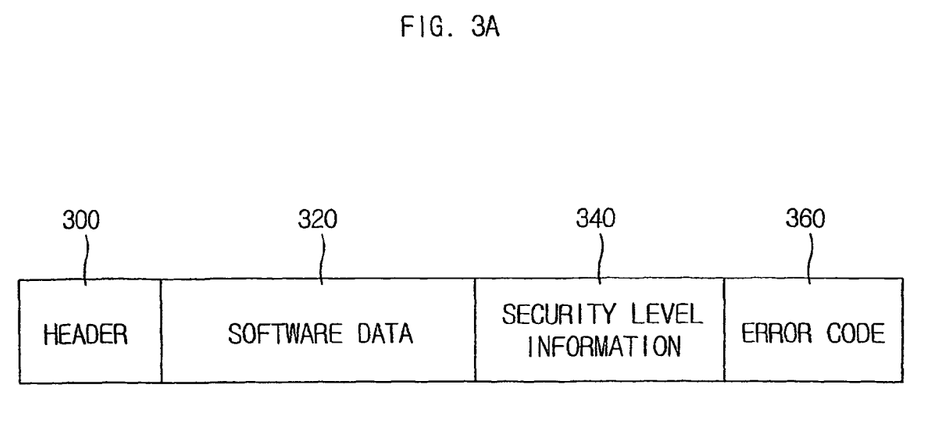
FIG. 3a shows a structure of the download file according to one embodiment of the invention.

FIG. 3a shows the structure of the download file according to one embodiment of the invention. When receiving the download request signal from the mobile terminal 130, the download server generates the download file including the software data corresponding to the download request signal and transmits the generated download file to the mobile terminal 130.

Referring to FIG. 3a, the download file comprises a header 300, software data 320, security level information 340, and an error code 360.

According to one embodiment of the invention, the header 300 includes information for the error code. The mobile terminal extracts information for the error code from the header, and generates the error code by the same method of the download server 100. Then by comparing the error codes, the mobile terminal can detect the occurrence of error in the software data.

The software data 320 is a data file corresponding to the software that the mobile terminal requests, and preferably the data file is downloaded in the compressed form. If the data file is compressed, the download server 100 must generate an error code for the compressed data file.

The security level information 340 includes information about resources that the software can access when the software is executed on the mobile terminal. The usable resource of the mobile terminal 130 is determined by the security level information, and the security level information can be designated to each unit of software respectively. The security level information will be described with FIG. 3b in detail.

The error code 360 is used to detect the error in the software data that occurred during transmission.

According to one embodiment of the invention, the download file that is transmitted from the download server 100 includes the error code 360 in order to detect error. Further, the mobile terminal 130 that receives the download file can detect the occurrence of error in the software data by use of the error code 360. The method for detecting the occurrence of error using the error code 360 is described in more detail.

The error code 360 can be generated by one of a parity check and Cyclic Redundancy Check(abbreviated as 'CRC'). The parity check, the simplest error detection method, adds a parity bit on the end of a data block; however, it cannot detect error when an even number of errors occur. Thus, in one embodiment, it is preferable to use CRC rather than the parity check. The error code 360 is Frame Check Sequence (hereinafter 'FCS') when using CRC. According to the method for detecting the occurrence of error in the mobile terminal, the mobile terminal 130 generates FCS for the software data by the same method of the download server 100, and compares the error code in the download file to the generated FCS to detect the occurrence of error.

When using CRC in one embodiment, CRC 16 and CRC 32 can be selectively used according to the type of the mobile terminal 130. According to one embodiment of the invention, CRC 16 can be used to detect the error in the commercial software for an ordinary user in order to increase the speed of authentication, and CRC 32 can be used to detect the error in the software for a developer in order to increase efficiency of verification in the developing procedure.

According to another embodiment of the invention, since there is high possibility of error occurrence other than the wired network because the commercial software is generally transmitted through the mobile communication network, CRC 32 can be used for downloading the commercial software. However, since the software for a developer is transmitted through cable, there is low possibility of error occurrence other than the wireless network. Thus, CRC 16 can be used as error code. In one embodiment of the invention, it is preferable to correct error as well as detect error.

It is preferable to use the automatic repeat request (abbreviated as 'ARQ') as an error correcting method. The ARQ corrects error by requesting retransmission of the data block having error from the transmitter after detecting error. In addition to ARQ, there is another error correction method, i.e., forward error correction (abbreviated 'FEC'). Since FEC can perform error detection and error correction simultaneously, the reverse channel is not needed and the continuous data flow is possible. However, since large overhead occurs for detecting and correcting error simultaneously, FEC is not a suitable correction method for the mobile terminal 130. Accordingly, it is preferable to use ARQ as an error correction method in one embodiment of the invention.

Also, in another data structure of the download file according to one embodiment of the invention, the header, the security level information and the error code are 1 byte, 1 byte and 4 bytes, respectively.

Figure 3B:
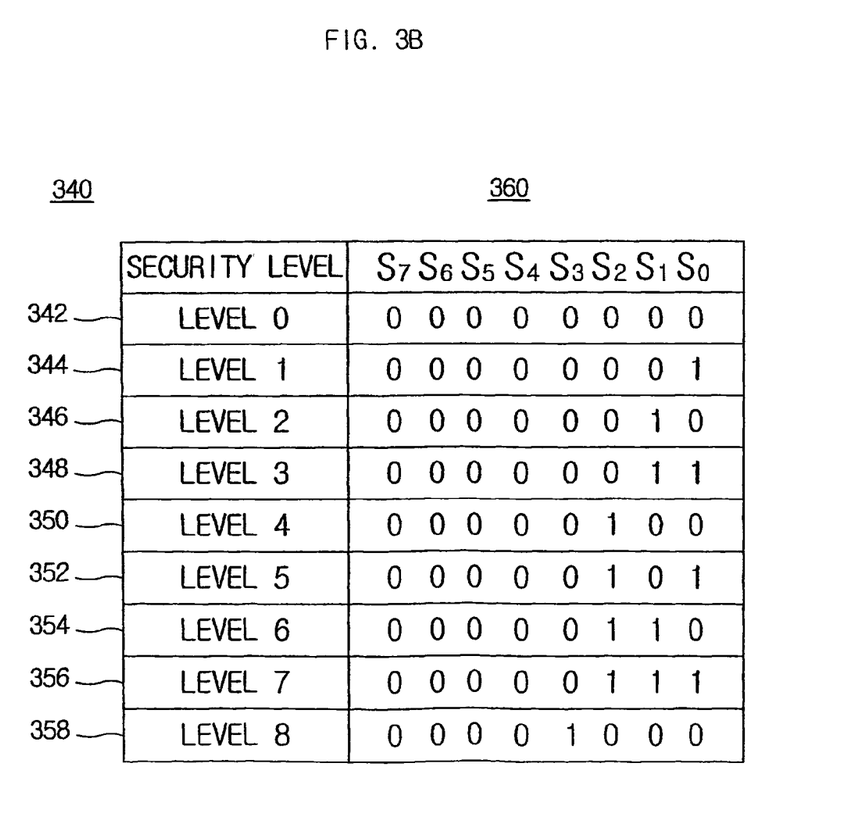
FIG. 3b shows the table of the security level information according to one embodiment of the invention.

FIG. 3b shows a table of the security level information according to one embodiment of the invention. The security level information 340 is designated for each unit of software, and the software can use the resource of the mobile terminal 130 within a range that the security level permits. Using the security level information 340, the security and stability can be maintained when the software is run on the mobile terminal 130. According to one embodiment of the invention, the grades of the security level can be classified into an application programming interface (abbreviated as 'API') security, a directory security, a library security, etc. and obviously the grades can be subdivided according to the importance of the system access. API enables an application program to use other programs such as an operating system(OS) or database management system(DBMS). Setting the range for an access right to an OS, file or library can solve problems related to security of personal information stored in the mobile terminal 130 and downloading of the mobile terminal when the software data is running.

Hereinafter, the function of the security level information 340 is described with FIG. 3b, however, it is not intended that the invention is limited to the exemplary classification shown in FIG. 3b.

'Level 0' 342 allows the software to access most mobile terminal's resources and relates to ESN, subscriber information such as channel allocation or stability of the mobile terminal and the wireless network.

'Level 1' 344 allows the software to access mobile identification number (MIN) and the current state of the mobile terminal. MIN is 34 bits indicating 10 digits of the phone number assigned to the mobile terminal and generally called a 'phone number'.

Figure 4:
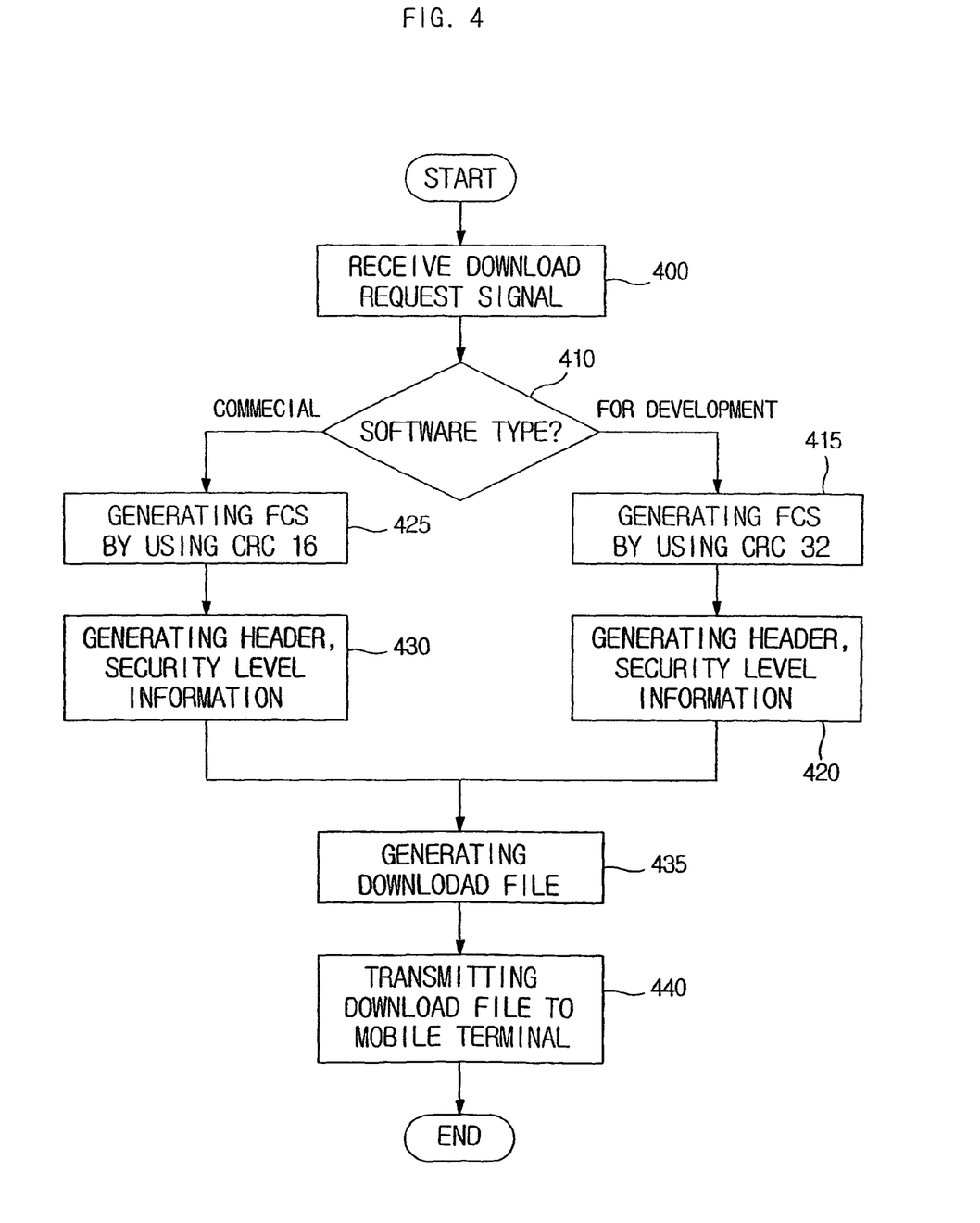
FIG. 4 is a flowchart for generating a download file in the download server according to one embodiment of the invention.

At 'level 2' 346, making a call and sending SMS are possible. At 'level 3' 348, the software can access the wireless resources such as TCP/IP, UDP, HTTP, and control files at 'level 4' 350. At 'level 5' 352 the software can control the serial communication, and at 'level 6' 354 all developers are allowed to access FIG. 4 is a flowchart for generating a download file in the download server according to one embodiment of the invention. The database coupled to the download server 100 stores software under development and commercial software data. After making a source code for the software data, the software developer complies the source code to produce the software data and uploads the software data to the download server 100. Software data under development can be uploaded to the download server 100 for testing and commercial software data after development can be uploaded to the download server 100, too. When the mobile terminal 130 transmits the download request signal, the download server 100 generates the download file including the software that the mobile terminal requests and transmits the download file to the mobile terminal 130. The procedure of generating the download file in the download server 100 will be described with FIG. 4.

At step 400, the download server 100 receives the download request signal from the mobile terminal 130. The download server 100 extracts the software data corresponding to the download request signal from the database. The extracted software data may or may not be in the form of a compressed file. If the software data is not compressed, then the download server 100 can compress the software data and include the compressed software data with the download file. When this compressed file is included with the download file, the download file must generate the error code by being related to the compressed software data.

At step 410, the download server 100 checks the kind of software that the mobile terminal 130 requests. According to one embodiment of the invention, software can be divided into software for a developer and commercial software. Allowing the software for a developer to be downloaded only to the developer mobile terminal can secure the development procedure.

With regard to the possibility of error occurrence and the efficiency of development, it is preferable to generate the error code according to the kind of software. For example, when using CRC according to one embodiment of the invention, the error code can be generated by either a CRC 32 polynomial or CRC 16 polynomial.

Hereinafter, the error code that is generated by CRC 32 will be noted as FCS 32(Frame Check Sequence 32). Also, the error code that is generated by CRC 16 will be noted as FCS 16(Frame Check Sequence 16). Thus, checking error occurrence of the commercial software is performed by FCS 16 and checking error occurrence of the software for developer is performed by FCS 32. Of course, checking error occurrence of the commercial software is performed by FCS 32 and checking error occurrence of the software for developer is performed by FCS 16. In one embodiment of the invention, checking the error occurrence on the commercial software is performed by FCS 16 to increase the authentication speed.

According to the result of step 410, if the software is the software for a developer, FCS 32 is generated at step 415. The method for generating FCS 32 is as follows: assuming that the data size of the commercial software is n bits, when carrying n bits by 16 bits and dividing by the predetermined k bits, then r bits remain. The remaining r bits are FCS 32. As aforementioned, if k is 32, then ox04c11db7 as divisor can be predetermined. At step 420, the download server generates a header indicating that the error code is FCS 32 and the security level information.

According to the result of step 410, if the software is the commercial software, FCS 16 is generated at step 425. In order to increase the authentication speed, it is preferable to use FCS 16 rather than FCS 32. Assuming that the data size of the commercial software is n bits, when carrying n bits by 16 bits and dividing by the predetermined k bits, then r bits remain. The remaining r bits are FCS 16. As aforementioned, if k is 16, then ox8005 as divisor can be predetermined.

Since the analysis of step 425 through step 430 is the same as the steps 415 through 420, the same description will be omitted here.

At step 435, the download server generates the download file that includes the software data, the security level information, and the error code. Also, at step 440, the download server transmits the generated download file to the mobile terminal 130.

Figure 5:
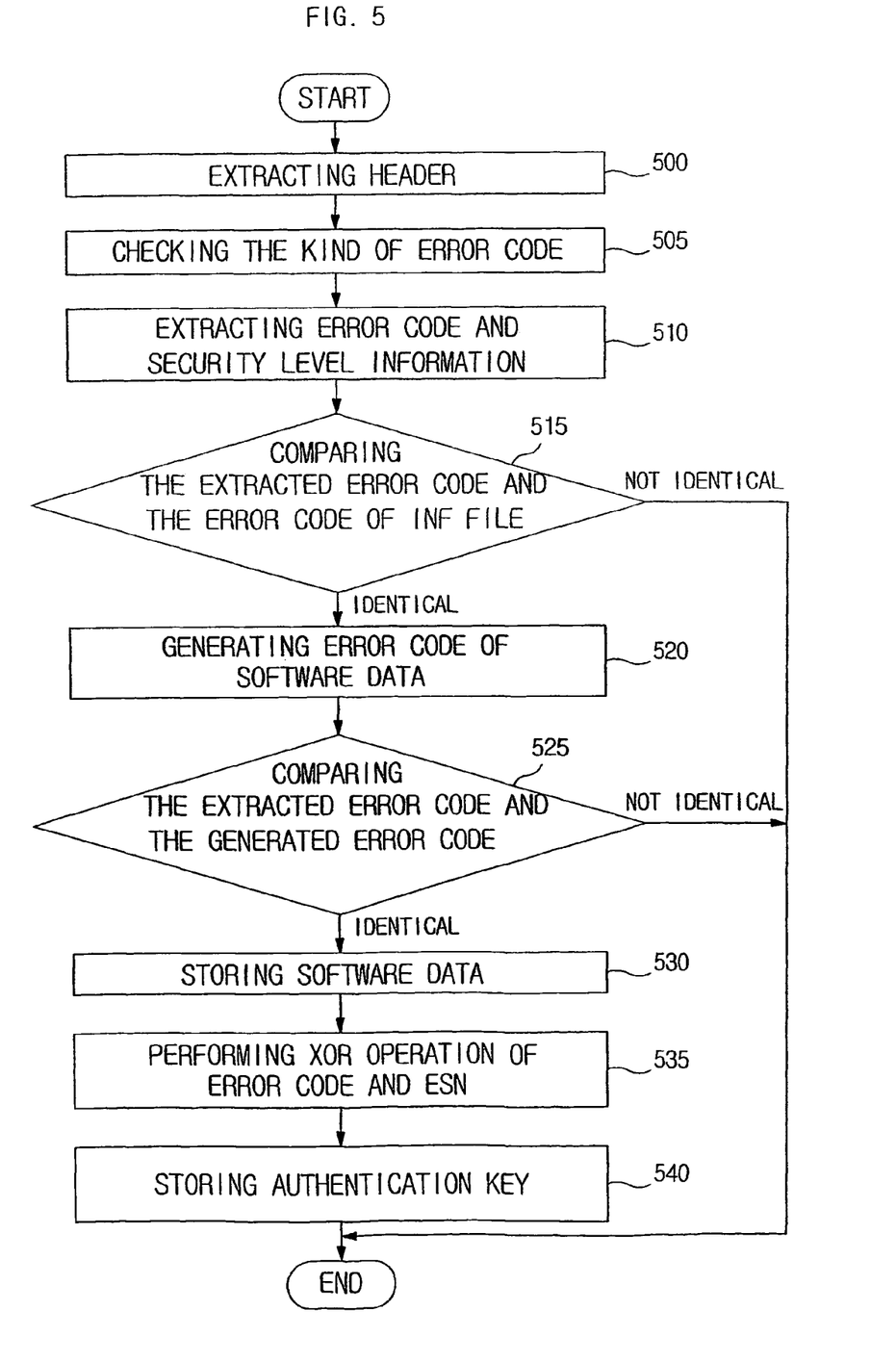
FIG. 5 is a flowchart of storing the program according to one embodiment of the invention.

FIG. 5 is a flowchart of storing the program according to one embodiment of the invention. According to one embodiment of the invention, when storing the software, the mobile terminal 130 generates an A-key corresponding to the software. After generating the A-key, the execution of the software is controlled by the A-key.

According to one embodiment of the invention, when the software in one mobile terminal attempts to be duplicated for another mobile terminal, the execution of the software is not permitted because A-keys in each mobile terminal are not identical. That is, since the error code for the software data and ESN are encoded, the software is not executed at the mobile terminal having a different ESN.

Hereinafter, the procedure for storing a program including the step of generating an A-key will be described with FIG. 5. At step 500, the mobile terminal 130 extracts a header from the download file. As described above, the download file comprises a header, software data and FCS, and can further comprise security level information. The header includes information about an error code. Namely, information included in the header indicates that the error code for the software data, i.e., FCS, is FCS 16 or FCS 32.

At step 505, the mobile terminal 130 checks the kind of FCS by use of the error code information included in the header. Further, at step 510 the mobile terminal extracts FCS and security level information from the download file.

At step 515, the mobile terminal 130 compares the security level information extracted from the download file with the security level information extracted from INF to check the occurrence of error in the security level information.

According to one embodiment of the invention, when receiving the download file from the download server 100, it is preferable to receive INF corresponding to the download file. Preferably the INF includes not only information required when installing the software in the mobile terminal 130 but also security level information. That is, after receiving INF, the mobile terminal 130 extracts security level information from INF and compares it to the security level information extracted from the download file. According to the result of this comparison, if the security level information included in JNF is not identical to the security level information extracted from the download file, then the storage process is suspended. Furthermore, according to the result of this comparison, if the security level information included in INF is identical to the security level information extracted from the download file, at step 520 the mobile terminal 130 generates FCS for the software data. In one embodiment of the invention, if the error code is FCS 16, the FCS is generated by the CRC 16 method. Also, if the error code is FCS 32, the FCS is generated by CRC 32 method.

At step 525, the mobile terminal 130 compares the FCS, the error code extracted from the download file, with the FCS generated at step 520. According to the results of the comparison, if the FCS extracted from the download file is not identical with the FCS generated at step 520, the storing process is suspended. Also, if FCS extracted from the download file is identical with the FCS generated at step 520, the storing process proceeds to step 530. At step 530, the mobile terminal 130 stores the software data extracted from the download file in the memory of the mobile terminal 130.

In one embodiment of the invention, the software data are included in the download file in the form of a compressed file. The software data in the form of a compressed file are stored in the mobile terminal 130, so the memory of the mobile terminal 130 can be efficiently used. Preferably the software is stored in the form of the compressed file and executed by use of INF when the mobile terminal is operated. Namely, it is preferable to use INF when executing the software without separating the storage step and executing step in the computer program.

At step 535, the mobile terminal 130 generates the A-key by combining an error code and ESN stored in the memory of the mobile terminal. Obviously various combinations exist, and in one embodiment of the invention, the combination can be performed by an exclusive logical OR. In the exclusive OR, i.e., one of Boolean operators, the result of an operation is true when one of two inputs is true and the other is false. Furthermore, the result of the exclusive OR is namely that the A-key is stored in the memory of the mobile terminal 130. In one embodiment of the invention, the A-key stored in the memory can be managed by a program manager. Generally, the program manager, which operates on a platform of mostly all mobile terminals, manages the application programs.

In step 500 through step 540, the software data are stored in the mobile terminal 130.

Figure 6:
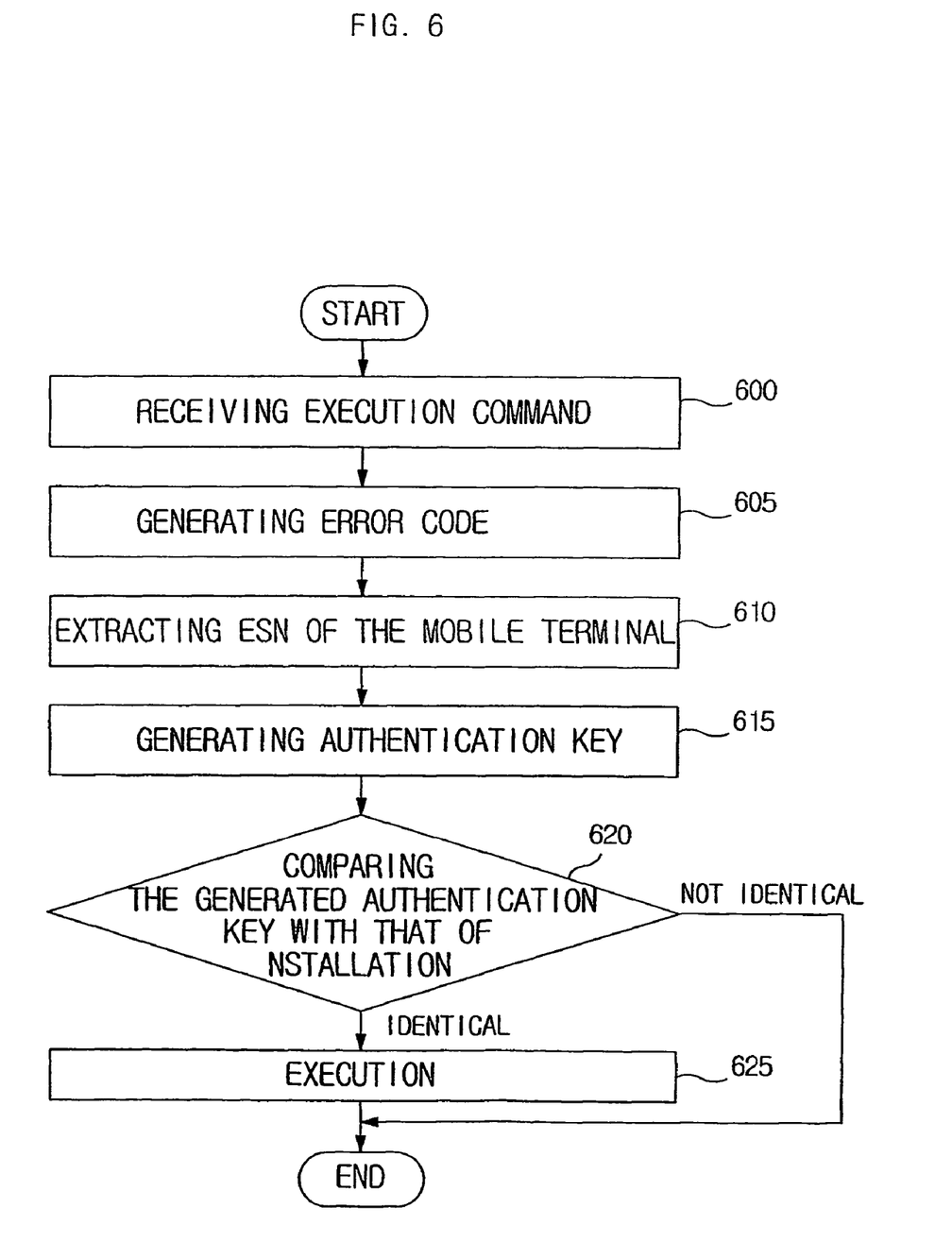
FIG. 6 is a flowchart of executing the software in the mobile terminal according one embodiment of the invention.

FIG. 6 is a flowchart of executing the software in the mobile terminal according to one embodiment of the invention. In one embodiment, even if the software data were duplicated without permission, the execution of the software data could be controlled by use of the A-key. Hereinafter, the control on the execution of the software will be described with FIG. 6.

At step 600, the mobile terminal 130 receives an execution command for the software data through an inputting means. At step 605, the mobile terminal 130 generates FCS, i.e., the error code, for the software data. In one embodiment of the invention, the software data is stored in the form of the compressed file.

Further, at step 610, the mobile terminal 130 extracts ESN from the memory. At step 615, the mobile terminal generates A-key by combining the error code and ESN. Obviously various combination methods exist, and in one embodiment, the exclusive OR is performed as a combination method. It is preferable to generate A-key by the same combination of step 535 in FIG. 5.

At step 620, the mobile terminal 130 compares the A-key generated at step 615 with the A-key stored in memory, which is stored at step 540 in FIG. 5. According to the results of this comparison, if the A-key generated at step 615 is not identical to the A-key stored in memory, which is stored at step 540, execution of the software will not occur. If the A-key generated at step 615 is identical to the A-key stored in memory, which is stored at step 540, the software is executed. The software can be executed by use of INF.

Figure 7A:
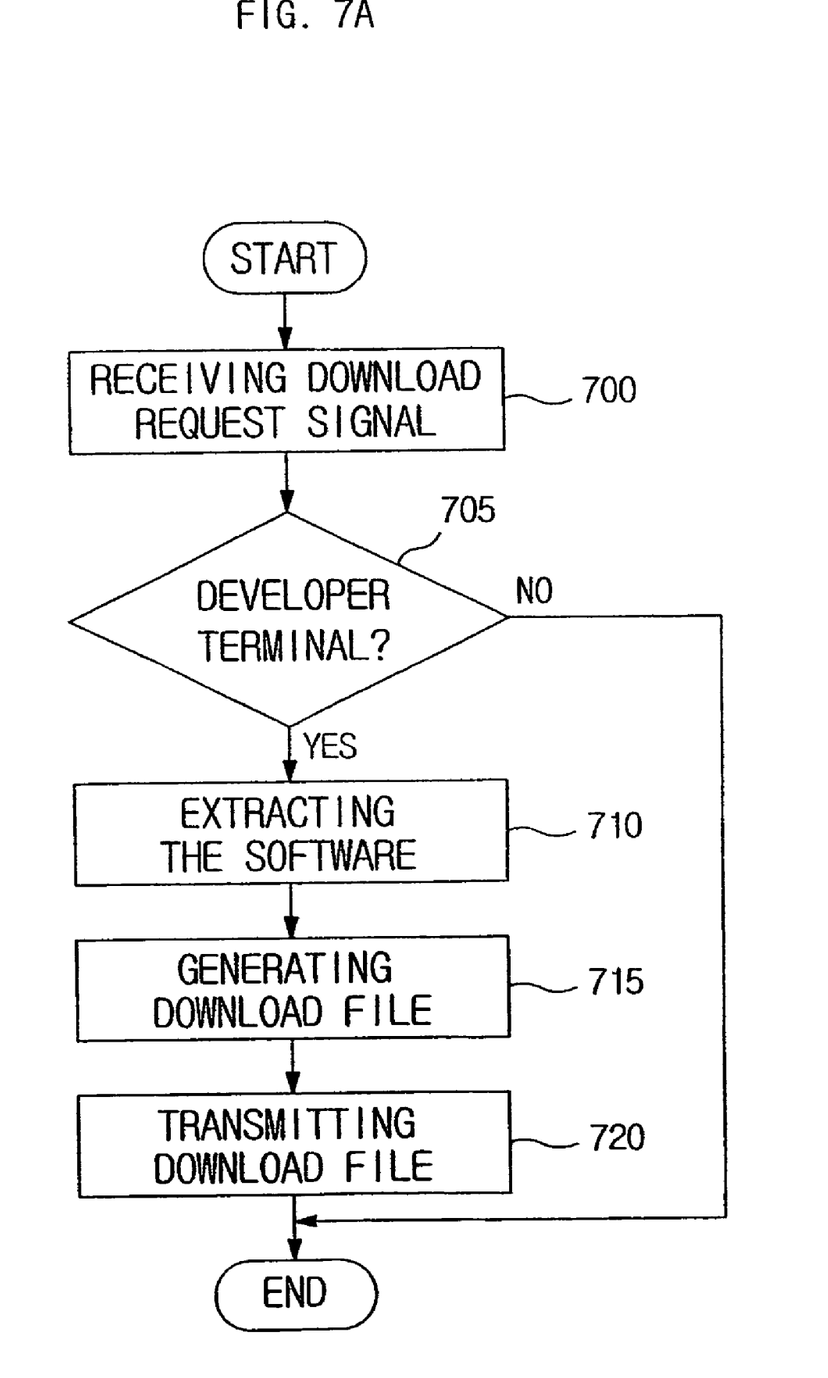
FIG. 7a is a flowchart of authenticating software according to one embodiment of the invention.
Figure 7B:
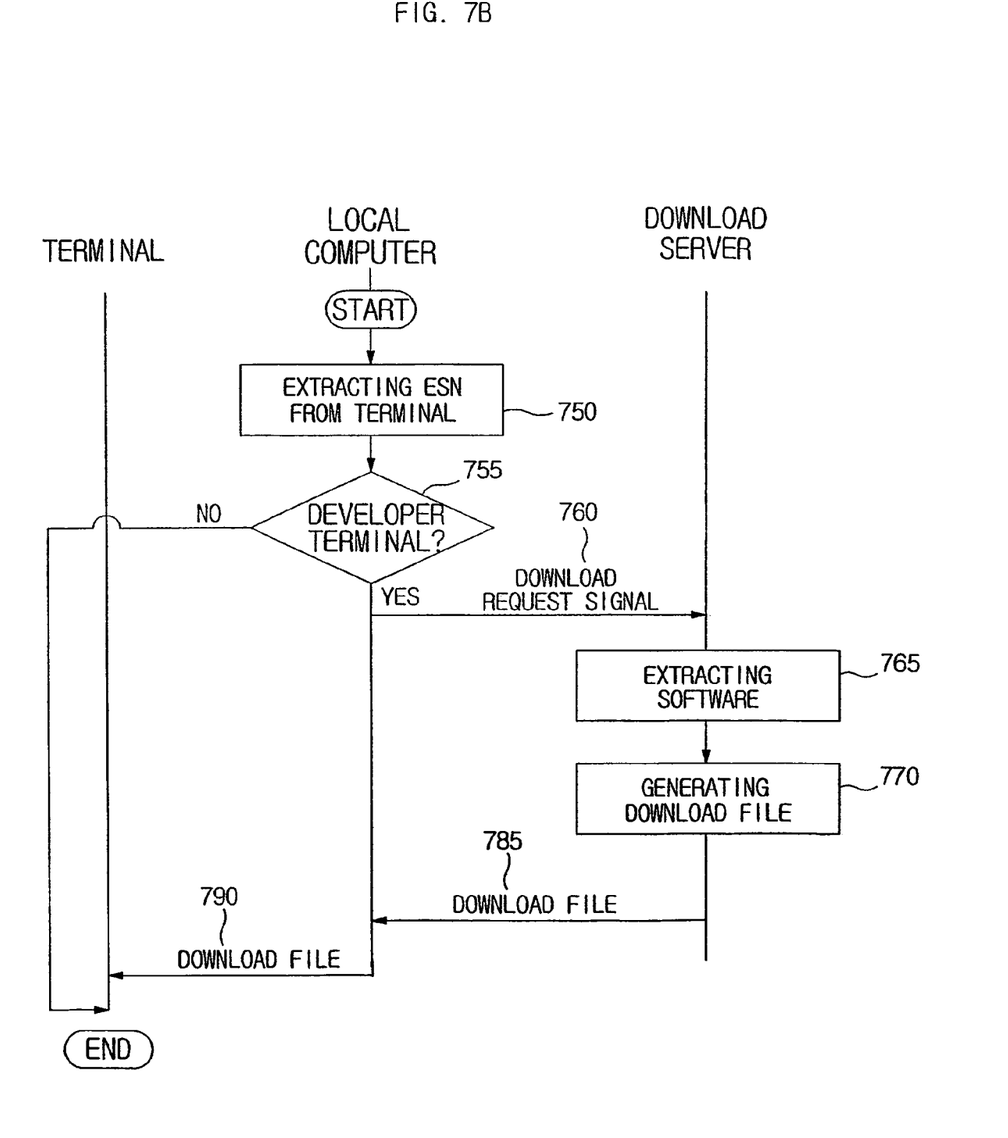
FIG. 7b is a flowchart of preventing software duplication according to one embodiment of the invention.

FIG. 7a and FIG. 7b are flowcharts of authenticating software according to one embodiment of the invention.

The software under development or post-development software is provided to the mobile terminal 100 from the download server 100. The software data uploaded to the download server are downloaded to the mobile terminal through a network or serial method.

Additionally, FIG. 6 shows the method for preventing duplication of the downloaded software data; FIG. 7a and FIG. 7b show the methods for preventing duplication at the download server 100. Situations in which a subscriber may use programs via an unauthenticated method are as follows: downloading the software for a developer in the user mobile terminal 120 through network access (FIG. 7a), and downloading software data in the user mobile terminal 120 through serial access (FIG. 7b).

FIG. 7a is a flowchart of authenticating software according to one embodiment of the invention. The software under development has to be uploaded into the download server 100 and downloaded at the mobile terminal 130 for testing. In this situation, by preventing the software under development from being duplicated without permission at the user mobile terminal 120, access to the information about the software under development can be prevented. Hereinafter, the method for authenticating software according to one embodiment of the invention will be described with FIG. 7a.

At step 700, the download server 100 receives a download request signal from the mobile terminal 130 that accessed the download server 100. At step 705, the download server 100 checks whether the mobile terminal 130 is a developer mobile terminal 110. One embodiment for distinguishing a developer mobile terminal in one embodiment of the invention is as follows: if all mobile terminals must comply with the authentication process via an ID and password when accessing the download server, the developer who registers his ID and password in advance can receive the software under development. Specifically, an ID and password used as an identifier can be used to distinguish each developer.

According to another embodiment of distinguishing a developer mobile terminal in one embodiment of the invention, the ESN of the developer mobile terminal can be used. In this situation, even if the developer were changed, the developer who has the ESN-registered developer mobile terminal could receive the software under development without a change in the database of the download server 100.

According to the result of the step 710, if the mobile terminal 130 is not a developer mobile terminal 110, the download server terminates access or transmits a disapproval message. If the mobile terminal 130 is a developer mobile terminal 110, the download server 100 extracts the corresponding software data at step 710 and generates a download file including the extracted software data at step 715. At step 720, the download server 100 transmits the generated download file to the mobile terminal 130.

Since the steps 710 through 720 are the same as the steps 415 through 440 in FIG. 4, the same description will be omitted here.

FIG. 7b is a flowchart of preventing duplication of software data according to one embodiment of the invention. According to one embodiment of the invention, it is more efficient to receive a download file from the local computer 140 through serial communication than from the download server 100 through a mobile network. Since software downloads frequently occur during the procedure of developing software, efficiency while developing software can be improved by using serial communication, which has low error occurrence and high download speed, for downloading. Thus, by permitting the receipt of a download file through serial communication only with the developer mobile terminal, security for the software under development can be maintained. Hereinafter, the download procedure through serial communication will be described with FIG. 7b. Assume that the mobile terminal 130 and the local computer 140 are connected to each other by cable, and the local computer 140 accesses the download server 100.

At step 750, the local computer 140 extracts ESN from the mobile terminal 130. The local computer 140 determines whether or not the mobile terminal 130 is the developer mobile terminal 110 by use of ESN. Here, ESN of the developer mobile terminal 110 is stored in advance in the storage of the local computer 140.

According to the result of step 755, if a developer mobile terminal 110 is not indicated, the local computer 140 can display a disapproval message for downloading on a display device. If developer mobile terminal 110 is indicated, the local computer transmits the download request signal to the download server at step 760.

At step 765, the download server 100 extracts the corresponding software data and generates the download file including the extracted software data at step 770. The download file is transmitted to the local computer 140 at step 785. Since the steps 765 through 770 are same as the steps 415 through 440 in FIG. 4, the same description will be omitted here.

At step 790, the local computer 140 transmits the download file to the mobile terminal 130. Through the aforementioned steps, the software for developer is downloaded only to the developer mobile terminal 110, so unauthorized duplication can be prevented.

By authenticating the software for a wireless mobile terminal, one embodiment of the invention can prevent duplication and execution of the software for the mobile terminal. Also, by preventing duplication of the software for mobile terminal, one embodiment of the invention can protect the copyright of a software developer or software developing company. Also, one embodiment of the invention provides software authentication suitable for the mobile terminal. Finally, one embodiment of the invention can prevent the duplication of the software under development.

Although the invention has been described with embodiments, the spirit and the scope of the invention will be determined only by the following claims. Also, it will be apparent for those skilled in the art that modifications or amendments to the aforementioned embodiment within the spirit and the scope of the invention are possible without departing from the boundary of the claimed invention.

The invention claimed is:

1. A method of authenticating software, the method comprising:
   receiving, at the mobile terminal, a download file from a server being in data communication with the mobile terminal, wherein the download file comprises software data and a first error code, and wherein the software data is a data file containing at least a portion of software;
   generating a second error code for the software data;
   storing the software data on the mobile terminal if the first error code corresponds to the second error code;
   generating a first authentication key based on the mobile terminal identifier and the first error code;
   receiving, at a mobile terminal, an execution instruction for software installed in the mobile terminal;
   generating a third error code for the software, wherein the third error code is configured to determine whether an error has occurred in the installed software;
   generating a second authentication key based on a mobile terminal identifier of the mobile terminal and the third error code, wherein the mobile terminal identifier includes an electronic serial number (ESN) of the mobile terminal;
   executing the installed software only if the second authentication key corresponds to the first authentication key stored in the mobile terminal, wherein the installed software is configured to use resources of the mobile terminal; and
   after the installed software is executed, controlling the amount of the resources of the mobile terminal which can be used by the installed software based on security level information,
   wherein the resources of the mobile terminal comprise at least one of the following: an electronic serial number (ESN) of the mobile terminal, subscriber information, channel allocation or stability of the mobile terminal and wireless network, a mobile identification number (MIN) of the mobile terminal, the current state of the mobile terminal, a phone call function and a function of sending a short message service (SMS) message.

2. The method of claim 1, wherein at least one of the first error code, the second error code, and the third error code is a frame check sequence generated by a CRC method.

3. The method of claim 2, wherein the first error code, the second error code, and the third error code are a 32 frame check sequence if the software is software for a developer.

4. The method of claim 2, wherein the first error code, the second error code, and the third error code are a 16 frame check sequence if the software is commercial software.

5. The method of claim 1, wherein the download file further comprises a header including information associated with the first error code.

6. The method of claim 1, wherein the download file further comprises first security level information.

7. A method of authenticating software between a server and a mobile terminal communicating data through a network, the method comprising:
   receiving, at the server, a download request signal from the mobile terminal, wherein the download request signal includes a mobile terminal identifier of the mobile terminal and an identification of software to be downloaded, and wherein the mobile terminal identifier includes an electronic serial number (ESN) of the mobile terminal;
   identifying the mobile terminal based on the mobile terminal identifier;
   determining whether or not the software is authorized to be downloaded to the mobile terminal;
   obtaining software data corresponding to the download request signal, wherein the software data is a data file containing at least a portion of the requested software;
   generating, an error code for the software data, corresponding to the mobile terminal, wherein the error code is configured to determine whether an error has occurred in the software data;
   generating security level information associated with the software, wherein the software is configured to use resources of the mobile terminal, and wherein the security level information, is configured to control, after the software is executed in the mobile terminal, the amount of the resources of the mobile terminal which can be used by the executed software;
   generating a download file including the software data, the error code and security level information;
   transmitting the download file to the mobile terminal;

generating, at the mobile terminal, a first authentication key based on the mobile terminal identifier and the error code, wherein the software is installed in the mobile terminal; and executing, at the mobile terminal, the installed software only if the first authentication key corresponds to a second authentication key stored in the mobile terminal, wherein the generated error code, in combination with the mobile terminal identifier of the mobile terminal, and an authentication key generated based on the transmitted download file in the mobile terminal, is configured to control the execution of the software at the mobile terminal, and wherein the resources of the mobile terminal comprise at least one of the following: an electronic serial number (ESN) of the mobile terminal, subscriber information, channel allocation or stability of the mobile terminal and wireless network, a mobile identification number (MIN) of the mobile terminal, the current state of the mobile terminal, a phone call function and a function of sending a short message service (SMS) message.

8. The method of claim 7, wherein the error code is a frame check sequence generated by a CRC method.

9. The method of claim 7, wherein the software is either software for a developer or commercial software.

10. The method of claim 9, wherein if the software is software for a developer, the software is downloaded only to a developer mobile terminal.

11. The method of claim 9, wherein if the software is commercial software, the error code is a 16 frame check sequence.

12. The method of claim 9, wherein if the software is software for a developer, the error code is a 32 frame check sequence.

13. The method of claim 7, wherein the generating security level information comprises:

generating a configuration information file including the security level information, wherein the configuration information file is transmitted to the mobile terminal, and wherein the mobile terminal compares the security level information included within the configuration information file with the security level information included within the download file to check whether an error has occurred in the security level information.

14. The method of claim 13, wherein the security level information is determined based on the scope of usable resource of the mobile terminal.

15. The method of claim 7, wherein the download file further comprises a header including information regarding the generated error code.

16. The method of claim 1, wherein the mobile terminal comprises at least one of the following: a cellular phone, a PDA (personal digital assistant), a PCS (personal communications service) and other wireless telecommunication device.

17. A system for authenticating software between a server and a mobile terminal communicating data through a network, wherein the system is configured to i) receive a download request signal from the mobile terminal, wherein the download request signal comprises an identification of software to be downloaded, ii) obtain software data corresponding to the download request signal, wherein the software data is a data file containing at least a portion of the requested software, iii) generate an error code, for the software data, corresponding to the mobile terminal, iv) generate security level information associated with the software, wherein the software is configured to use resources of the mobile terminal, and wherein the security level information, after the software is executed in the mobile terminal, is configured to control the amount of the resources of the mobile terminal which can be used by the executed software, v) generate a download file including the software data, the error code and security level information, vi) transmit the download file to the mobile terminal, wherein the error code is configured to determine whether an error has occurred in the software, vii) generate, at the mobile terminal, a first authentication key based on the mobile terminal identifier and the error code, wherein the software is installed in the mobile terminal and viii) execute, at the mobile terminal, the installed software only if the first authentication key corresponds to a second authentication key stored in the mobile terminal, wherein the generated error code, in combination with a mobile terminal identifier of the mobile terminal and an authentication key generated based on the transmitted download file in the mobile terminal, is configured to control the execution of the software at the mobile terminal, wherein the mobile terminal identifier includes an electronic serial number (ESN) of the mobile terminal, and wherein the resources of the mobile terminal comprise at least one of the following: an electronic serial number (ESN) of the mobile terminal, subscriber information, channel allocation or stability of the mobile terminal and wireless network, a mobile identification number (MIN) of the mobile terminal, the current state of the mobile terminal, a phone call function and a function of sending a short message service (SMS) message.

18. The system of claim 17, wherein the mobile terminal comprises at least one of the following: a cellular phone, a PDA (personal digital assistant), a PCS (personal communications service) and a wireless telecommunication device.

19. One or more processor readable storage devices having processor readable code embodied on the processor readable storage devices, the processor readable code for programming one or more processors to perform a method of identifying extreme behavior in elements of a network, the method comprising:

receiving, at a mobile terminal, an execution instruction for software installed in the mobile terminal;

generating a first error code for the installed software, wherein the first error code is configured to determine whether an error has occurred in the software;

generating a first authentication key based on a mobile terminal identifier of the mobile terminal and the first error code, wherein the mobile terminal identifier includes an electronic serial number (ESN) of the mobile terminal; and executing the installed software only if the first authentication key corresponds to a second authentication key stored in the mobile terminal, wherein the installed software is configured to use resources of the mobile terminal; and after the installed software is executed, controlling the amount of the resources of the mobile terminal which can be used by the installed software based on security level information, wherein the resources of the mobile terminal comprise at least one of the following: an electronic serial number (ESN) of the mobile terminal, subscriber information, channel allocation or stability of the mobile terminal and wireless network, a mobile identification number (MIN) of the mobile terminal, the current state of the mobile terminal, a phone call function and a function of sending a short message service (SMS) message.

20. A system for authenticating software, the system comprising:

means for receiving, at a mobile terminal, an execution instruction for software installed in the mobile terminal;

means for generating a first error code for the installed software, wherein the first error code is configured to determine whether an error has occurred in the software;

means for generating a first authentication key based on a mobile terminal identifier of the mobile terminal and the first error code, wherein the mobile terminal identifier includes an electronic serial number (ESN) of the mobile terminal; and means for executing the installed software only if the first authentication key corresponds to a second authentication key stored in the mobile terminal, wherein the installed software is configured to use resources of the mobile terminal; and means for controlling, after the installed software is executed, the amount of the resources of the mobile terminal which can be used by the installed software based on security level information, wherein the resources of the mobile terminal comprise at least one of the following: an electronic serial number (ESN) of the mobile terminal, subscriber information, channel allocation or stability of the mobile terminal and wireless network, a mobile identification number (MIN) of the mobile terminal, the current state of the mobile terminal, a phone call function and a function of sending a short message service (SMS) message.

21. The method of claim 1, wherein the second authentication key is generated in the mobile terminal.

22. The storage devices of claim 19, wherein the second authentication key is generated in the mobile terminal.

23. The system of claim 20, wherein the second authentication key is generated in the mobile terminal.

* * * * *